Aug. 26, 1952 C. W. THULIN 2,608,610

TRANSFORMER

Filed Jan. 28, 1950 2 SHEETS—SHEET 1

INVENTOR
C. W. THULIN

BY [signature]

ATTORNEY

INVENTOR
C. W. THULIN
BY
[signature]
ATTORNEY

Patented Aug. 26, 1952 2,608,610

UNITED STATES PATENT OFFICE 2,608,610

TRANSFORMER

Charles W. Thulin, Morristown, N. J., assignor to Bell Telephone Laboratories, Incorporated, New York, N. Y., a corporation of New York Application January 28, 1950, Serial No. 141,139

2 Claims. (Cl. 175—356)

This invention relates to inductance devices and more particularly to network coupling transformers.

In certain transmission systems, such as those employing coaxial cables, it has been found desirable in order to maintain a proper signal-to-noise ratio that repeaters be provided at prescribed, for example approximately four-mile, intervals. System requirements also dictate that the terminal-to-terminal transmission for any length system should be flat within a very low gain variation, such as 1 decibel, at any frequency in a wide frequency range, such as from 200 kilocycles to 8.35 megacycles. In a transcontinental or 4000-mile system it is thus apparent that with four-mile intervals 1000 repeaters should be used. In order to maintain the transmission loss characteristics within the desired tolerance, each individual component of the repeater networks must be held within extremely fine limits.

One accepted way of maintaining the required transmission precision is through the use of mop-up equalizers which are placed after a certain number of repeaters and which serve to correct for variations in the repeaters. The number of equalizers used and their complexity are dependent on the magnitude of the irregularities or systematic deviations in the repeater components. Further, the use of equalizers involves, in part at least, the assumption that the deviation of any component of the repeater from normal or random variation is the same for all the repeaters.

This manner of having the system absorb the element deviations is costly. For each repeater gain deviation, the mop-up equalizer must contain a complementary loss shape or the equivalent to provide the required over-all transmission characteristic over the wide frequency range. Further these deviations in the various elemental components of the repeater may cause a reduction in the repeater spacing for signal-to-noise reasons, even with the added mop-up equalizers, and thus result in still additional cost. In addition, random variations in these systematic deviations between different repeaters limit the use of mop-up equalizers.

These line repeaters, or amplifiers, which may be composed of several networks for the wide frequency range being transmitted, employ transformers for coupling to the coaxial cable, the transformers being used for both the input and output coupling networks. The functions of these transformers in the coupling networks and the repeaters are to isolate the repeater from the cable, to provide a means of terminating the cable in the desired arrangement, and also to provide elements for a shaping network used to compensate for the frequency characteristic of the cable. The network elements contributed by the transformer include the parasitic capacitances of both the primary and secondary windings, the leakage inductance, and the effective winding resistance. These parasitic elements must be held to close tolerances, and in particular the leakage inductance and the parasitic capacitance of the secondary winding which have a very high transmission sensitivity, resulting in large gain deviations per per cent change in their magnitude from the norm. It is of primary importance that the random variations in these parasitic elements be decreased so that the systematic deviations between different transformers because of these parasitic elements may be compensated for. It is then also of importance that these systematic deviations be decreased.

An object of this invention is to improve the performance of transformers.

Another object of this invention is to provide a transformer whose electrical characteristics are within very fine tolerances.

Another object of this invention is to decrease the gain loss due to transformer electrical characteristics.

A further object of this invention is to decrease the variations in the parasitic capacitances of the secondary windings.

Still another object of this invention is to provide accurate control of the leakage inductance and the effective winding resistance.

These and other objects are realizable in accordance with one illustrative embodiment of this invention in which two concentric coaxial forms are closely spaced, the one inside the other, on the central portion of a magnetic shell-type core. The primary and secondary windings are placed on these forms. An electrostatic shield is coated or otherwise placed on the inner surface of the outer winding form.

The primary and secondary windings are placed on the winding forms by first cutting a spiral groove in the form, as with a diamond saw, then metallizing the whole form with a conductive coating, such as silver and copper, and subsequently removing the metal from the land between the grooves until the winding form material is again exposed. The conductive material in the spirals then acts as a spiral wire coil on the form.

On another illustrative embodiment employing a differently shaped core, a middle form is placed between the two forms and an electrostatic shield coated or otherwise placed on at least one surface thereof.

The capacitance between an outer winding on a form and a shield placed adjacent the other side of the form, which is sometimes called the direct capacitance, is dependent on both the capacitance from the winding on the outer surface of the form to the inner surface of the form and the capacitance from that inner surface to the shield. While the distance involved in the first capacitance is much greater than that involved in the latter, the dielectric constant of air, for the latter capacitance, is much less than that for the material of the winding form, so that both capacitances must be taken into account. The tolerance in the value of the capacitance due to the form is determined by the accuracy of the machining of the form; however, variations arise in the exact spacing of an electrostatic shield from the winding form and because of the greater dielectric constant for air, these small distance variations cause large random variations in the value of the parasitic capacitance of the outer or secondary winding. These random variations from one transformer to the next in the repeaters or amplifiers may be as great as the systematic deviations themselves which are present and can be corrected for.

In accordance with one feature of this invention the electrostatic shield is directly secured to the winding form.

In accordance with a further feature of this invention, the critical dimensions of the transformer are accurately controlled to practically eliminate variations in the parasitic components.

In accordance with a further feature of this invention, all of the conducting elements of the transformer are directly secured to the forms.

The aforementioned and other features of the invention will be more readily understood by consideration of the following detailed description and accompanying drawings, in which.

Figures 1, 2, 3, 4:
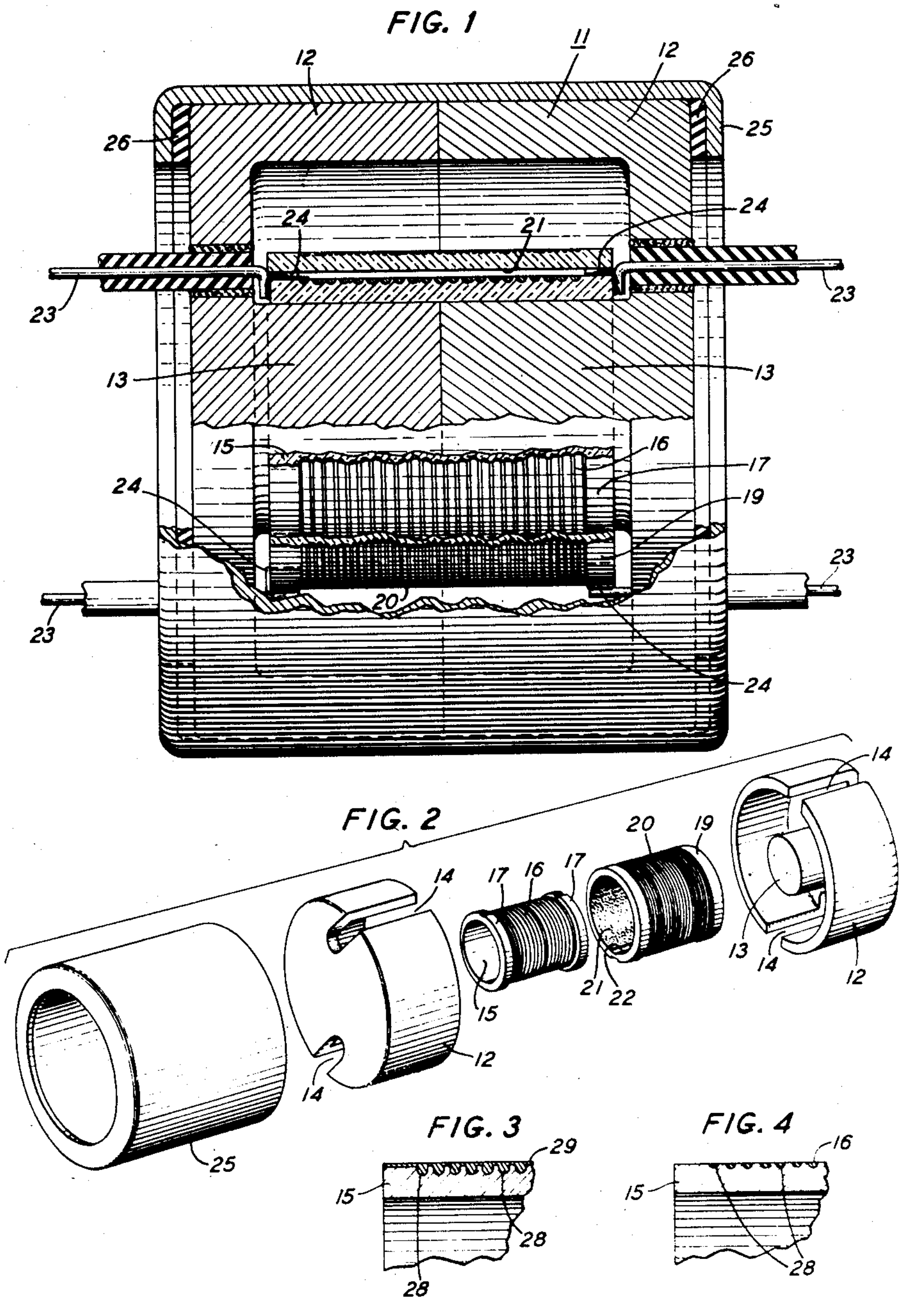
Fig. 1 is a view of a transformer illustrating one embodiment of this invention, a portion being shown in section and a portion being shown with part of the core and winding forms having been broken away.
Fig. 2 is an exploded view of the transformer, showing the split core and concentric winding forms.
Fig. 3 is an enlarged sectional view of a portion of the winding form, showing the winding during one stage of fabrication.
Fig. 4 is an enlarged sectional view of the same portion of the winding form, showing the finished winding thereon.

Referring now to the drawings, the transformer illustrated in Fig. 1 comprises a core 11, which may be of ferrite or other advantageous magnetic material, that encloses the windings, the core being made up of two shell-like parts 12 having central portions 13. Each shell 12 has two cut-out portions 14 extending from the top along the side thereof. An inner winding form 15, which may be of a ceramic such as a steatite or of fused quartz or other suitable insulating material advantageously having a very low coefficient of expansion and capable of being precisely machined, fits tightly over the central portions 13 of the core 11. The winding form 15 may be made tight to the central portions 13 by placing between the two some suitable binder, such as a pyroxylin cement. An inner winding or spiral 16 is placed on the outer surface of the inner winding form 15, in a manner to be described, between raised end portions 17. An outer winding form 19 fits tightly onto the raised end portions 17 and has a winding or spiral 20 placed on the outer surface, in a manner to be described.

An electrostatic shield 21 is placed directly onto the inner surface of the outer winding form, the shield having a break or gap 22 in it to prevent a closed circuit. The shield may advantageously be plated or electrodeposited onto the winding form, depending on the material of the winding form. Thus if the form is of plastic material, the shield may be made by first depositing silver thereon from a silver bath and then plating the copper onto the silver base.

Connections are made to the windings by insulated leads 23 and metal connectors 24, one of which connectors of the outer or secondary winding may also be connected to the shield 21. The ferrite core 11 is held together by a clamp 25 which is spaced from the end of the core by gaskets 26. The leads are brought out through the cut-out portions 14 in the shells 12, the cut-out portions preventing a complete ring or circuit around each lead which would then substantially increase the lead inductance. This split ring, which is effected by the cut-out portions 14, could be avoided by bringing two leads out through one aperture in the same shell or by a different shaped core, such as a rectangularly shaped one. However, a shell core with a central portion has been found to be advantageous from a magnetic circuit standpoint for this embodiment.

Figure 5:
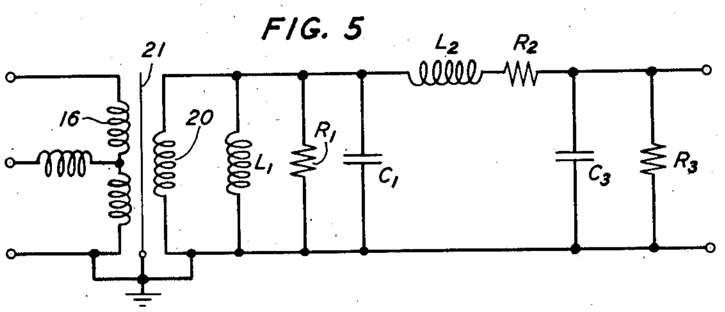
Fig. 5 is a schematic of the equivalent network for the transformer of Fig. 1.

Referring now to Fig. 5, there is shown the equivalent network representation for the ideal transformer shown in Fig. 1, which is here shown having a double primary winding 16 and a secondary winding 20, between which is the electrostatic shield 21 which is connected to each of the windings and to ground. As both windings are shown connected to ground, there is no potential difference between them. $L_1$ is the mutual inductance, $C_1$ the parasitic capacitance of the primary winding, and $R_1$ the dissipation associated with $L_1$ and $C_1$. $L_2$ is the leakage inductance and $R_2$ the effective winding resistance. $C_3$ is the parasitic capacitance of the secondary winding, which is sometimes called the distributed capacitance and can be shown theoretically to be one-third the direct capacitance between the shield and the secondary winding when the two are connected together and to ground, and $R_3$ is the dissipation associated with $C_3$.

It can be shown that $C_3$ has a larger transmission sensitivity than $C_1$ so that random variations in the magnitude of $C_3$ are a primary concern. In one specific embodiment of this invention, it was found that both $L_2$ and $C_3$ had transmission sensitivities of the order of .08 decibel per per cent change in magnitude. Accordingly, these particular parasitic elements must be held within very close tolerances. As discussed above, $C_3$ is dependent upon the value of the capacitance from the outer winding to the inner surface of the form and from that surface to the shield. By plating or otherwise attaching a thin film electrostatic shield on this surface, the variation in capacitance resulting from the presence of the air-gap, whose size cannot be accurately controlled, is eliminated. Further variations in that capacitance due to the inability of accurately and precisely mounting a shield a determined distance away from the surface are also eliminated. As the value of $C_3$ is thus dependent now on the thickness of the winding form without any variable air-gap and as that thickness can be accurately controlled in machining, random deviations in $C_3$ are eliminated and the exacting tolerance advantageous to the transformer's use may be attained. Specifically for a transformer in which the electrostatic shield 21 is directly attached to the inner surface of the outer winding form so that only the dielectric constant of the form and its thickness need be considered, it can be shown that $$C_3=\frac{Akl(2d'-t)}{t}$$

where $k$ is the dielectric constant of the outer winding form, $l$ its length, $t$ its thickness, $d'$ the distance from the center of the core to the outer surface of the outer winding form, and A a constant.

The attaching of the shield 21 directly to the inner surface of the outer winding form 19 also has the beneficial effect of reducing the effective winding resistance, $R_2$, which is related to the size and dimensions of the shield, it having been determined experimentally that there is less power dissipation due to the complex eddy currents induced by the leakage flux with thinner shields. In prior shields which are spaced away from the winding forms and between them, provision must be made to support the shield and the shield itself must be large enough to be thus supported. In devices constructed in accordance with this invention, however, as the shield 21 need not be self-supporting and may be in fact as thin as is thought advisable for electrostatic reasons, $R_2$ can be considerably reduced. In one specific embodiment of this invention, it has been found that the thickness of the shield 21 may advantageously be reduced to half of what would be required for the support of a separately supported shield.

The leakage inductance, $L_2$, as well as the parasitic capacitance of the secondary winding, $C_3$, both of which are of primary importance in attaining the close tolerances desired, is also dependent on other critical dimensions of the transformer. Specifically, it can be shown that, when referred to the secondary, $$L_2=\frac{ArN^2}{l}(d+B(w_1-2w_2))$$

where $r$ is the mean distance from the center line of the core to the two windings, N is the number of turns in the secondary, $l$ the length of the winding, $d$ the distance from the outer surface of one winding form to the outer surface of the other, $w_1$ and $w_2$ the thickness of the outer and inner windings, respectively, and A and B are constants. From this it can be seen that the leakage inductance is dependent, inter alia, on the values of the winding thickness and the distance between the windings.

Thus, it is apparent that not only must the dimensions of the winding forms be kept within very close tolerances, but further that the thickness of the windings themselves must be accurately controlled. The usual winding of fine wire onto a ceramic or other form will not give sufficient control of variations to prevent excessive random variations in the value of $L_2$. In wire wound transformers, variations arise both because of differences in the cross-section of the very small diameter wire and the insulation on the wire, in cases where insulation is required. These differences are due mainly to changes in the diameters resulting from the stretching of the wire while it is being applied to the winding form. Variations also arise because of movement of the wire on the form due to its higher thermal expansion. To obtain spirally wound coils for use in combination with the other elements of this transformer which will not be subject to these random variations the windings 16 and 20 are fabricated in accordance with the technique described below.

A blank winding form, such as a ceramic, Pyrex glass, fused quartz or similar advantageous material is first prepared which is oversize in all dimensions. It is then machined, as by diamond tools, to the exact final dimensions except for the outside diameter which is left slightly oversize. Spiral grooves 28 are then cut into the ceramic where the windings are desired and the surfaces are coated with a conductive paste, such as a sliver paste, though a molybdenum-nickel-iron or other conductive paste known in the art may be employed. The paste may advantageously be fired onto the form. A copper plating 29 is then deposited on the form, as shown in the enlarged sectional portion Fig. 3. The excess copper is then machined off, the process at the same time removing the metal from the land between the grooves until the form is exposed and also machining the outside diameter of the form to its final dimension as shown in the enlarged sectional portion Fig. 4. The copper then acts as a spiral wire coil winding 16. This procedure leaves the windings bonded to the ceramic so that the winding has a very precise geometry and further so that this precise geometry has a minimum variance with time and temperature, since all changes are controlled by the material of the winding forms.

As both the windings 16 and 20 and the electrostatic shield 21 are thus bonded to the winding forms and their geometry determined by that of the form, the constants $L_2$ and $C_3$ can be reproduced from transformer to transformer to the desired degree of accuracy. Further changes in their value with time or temperature are very slight as there is no movement of the winding or shield away from the form due to the constraining force of the bond between the metal and the form.

Further by accurately machining the raised end portions 17 the spacing between the winding forms is accurately controlled. Thus by employing the features of this invention accurate control of all critical dimensions of the transformer is attained.

Figures 6, 7:
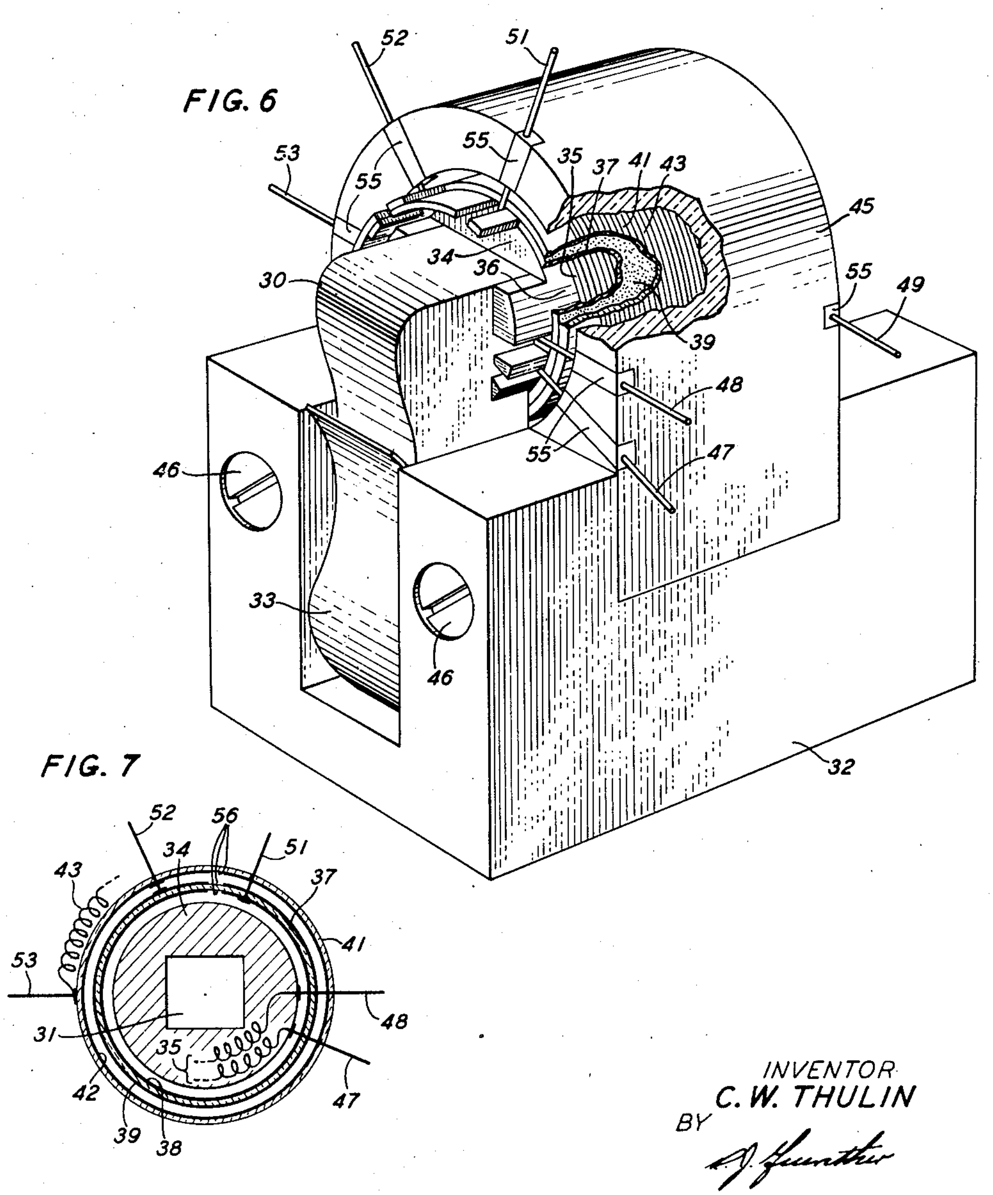
Fig. 6 is a perspective view of another embodiment of this invention with part of the housing and winding forms having been broken away.
Fig. 7 is a schematic plan view of one end of the embodiment of Fig. 6 showing particularly the electrostatic shields and the connections to the shields and the windings.

One illustrative embodiment of this invention, as shown in Fig. 1, that was constructed had the following dimensions, which are noted to exemplify sample tolerances that are attainable through the use of this invention:

Over-all height of core, 1.015±.030 inch
Over-all diameter of core, 1.250±.030 inch
Outer diameter of our form, .6710±.0003 inch
Thickness of outer form, .040±.0004 inch
Width of slots on outer form, .0040±.0003 inch
Conductor thickness of outer winding, .0040±.0003 inch
Thickness of shield, .0003±.0002 inch Referring now to Fig. 6, there is shown another illustrative embodiment of this invention in which the primary winding is further shielded from the secondary winding and from capacitance effects between it and the shield placed directly on the inner surface of the outer winding form. As shown in this figure, a substantially rectangularly shaped core 30, which may be of ferrite or other advantageous magnetic material, is held in a base or cradle 32, which may be of plastic or ceramic, by a bracket 33. The core 30 comprises an upper arm 31 and a lower arm effecting a closed magnetic circuit, both arms being shown as substantially square, although the arms may advantageously be of circular or other form. The lower arm is positioned in the cradle 32. An inner winding form 34 fits tightly onto the upper arm, the form having a central square aperture. The winding form is advantageously of a ceramic, such as steatite or fused quartz or other suitable insulating material similar to the winding forms of Fig. 1. Similarly, the winding form 34 may be made tight to the upper arm 31 of the core 30 by some suitable binder. An inner winding or spiral 35 is placed onto the winding form 34, as in the manner previously described with respect to Figs. 3 and 4. A middle cylindrical form 37 fits tightly over raised end portions 36 on the inner winding form 34. An electrostatic shield 38 is directly placed on the inner surface of this middle form 37 and an electrostatic shield 39 placed directly on the outer surface of the middle form. An outer winding form 41 fits tightly onto the middle form 37. An electrostatic shield 42 is placed directly onto the inner surface of the outer winding form 41 and a winding 43 placed on the outer surface as in the manner previously described. The processing and materials may advantageously be as described in connection with the prior embodiment. A housing 45, which may advantageously be of a ceramic or plastic, covers the winding forms and fits into the base 32, being secured thereto as by screws 46.

The connections through the housing 45 are best seen in Fig. 7, which is a schematic representation of a plan view of the transformer and in which the spacings between the forms are greatly exaggerated. As best seen there, leads 47 and 48 are secured to the winding 35, which is depicted as a double winding. Lead 49, shown in Fig. 6, is secured to the central portion of the double winding. Lead 51 is secured to the shield 38 on the under side of the form 37. Lead 52 is secured to both the shield 39 on the outer surface of the middle form 37 and the shield 42 on the inner surface of the outer form 41. Lead 53 is secured to one end of the outer winding 43, the other end being secured to a lead not shown but which is opposite lead 49 in Fig. 6.

Each of the leads is sealed into the housing 45 through a metallized member 55. Each of the electrostatic shields has a gap 56 in it to prevent a closed circuit.

The two shields 42 and 39 are electrically connected together to avoid any capacitance due to the air-gap between them and to avoid variations in spacing due to that air-gap. Shield 39 could be omitted in another embodiment of this invention to attain a slightly lower value of capacitance between the outer and inner shields but at the expense of an increase in the systematic capacitance variation between the two windings.

In one illustrative form of this embodiment, the inner shield 38 was connected through lead 51 to ground while the outer shield, comprising the two shields 39 and 42 electrically connected together, was connected through lead 52 and through a resistor to one side of the secondary winding 43. Therefore, although the primary and secondary windings are at different potentials with respect to ground, disturbances or variations in voltage in the secondary cannot appear in the primary due to any capacitance coupling between them; instead, these capacitance variations appear between the shield 38 and the outer shield, comprising shields 39 and 42, and thus are shunted to ground. Therefore, the input and output networks, or the primary and secondary windings, are completely isolated.

The random variations in the parasitic capacitance of the secondary windings and the random variations in the leakage induction of the secondary are both kept within close tolerances due to the careful control on the crucial dimensions, as discussed fully above. It is thus apparent that both the random and systematic deviations in these values can be controlled as taught by this invention regardless of the number of forms, windings, and electrostatic shields employed.

It is to be understood that the above-described arrangements are illustrative of the application of the principles of the invention. Numerous other arrangements may be devised by those skilled in the art without departing from the spirit and scope of the invention.

What is claimed is:

1. A transformer comprising a first winding form of insulating material, a second winding form of insulating material surrounding said first, a middle form of insulating material interposed between said two winding forms, means for accurately spacing said forms from each other, said winding forms each having in the outer surfaces thereof a spiral groove, conductive material in said grooves, and a discontinuous metallic layer on the inner surface of said second winding form and on each surface of said middle form, said conductive material and said metallic layers being bonded to said forms.

2. A transformer comprising a core of magnetic material, an inner and an outer winding form of insulating material around said core, each of said winding forms having in the outer surface thereof a spiral groove, conductive material in said grooves, a discontinuous metallic layer on the inner surface of said outer form, a third form of insulating material between said two winding forms, a discontinuous metallic layer on at least one surface of said third form, and means accurately spacing said forms from each other.

CHARLES W. THULIN.

REFERENCES CITED

The following references are of record in the file of this patent:

UNITED STATES PATENTS

| Number | Name | Date |
| --- | --- | --- |
| 1,320,980 | Bowman | Nov. 4, 1919 |
| 1,548,022 | Casper et al. | Aug. 4, 1925 |
| 1,910,957 | Llewellyn | May 23, 1933 |
| 2,170,048 | Dunning et al. | Aug. 22, 1939 |
| 2,297,488 | Luderitz | Sept. 29, 1942 |
| 2,318,271 | Weiche | May 4, 1943 |
| 2,375,309 | McCoy | May 8, 1945 |

OTHER REFERENCES

New Advances in Printed Circuits, National Bureau of Standards, Publication #192, Nov. 22, 1948.